Patented Sept. 6, 1927.

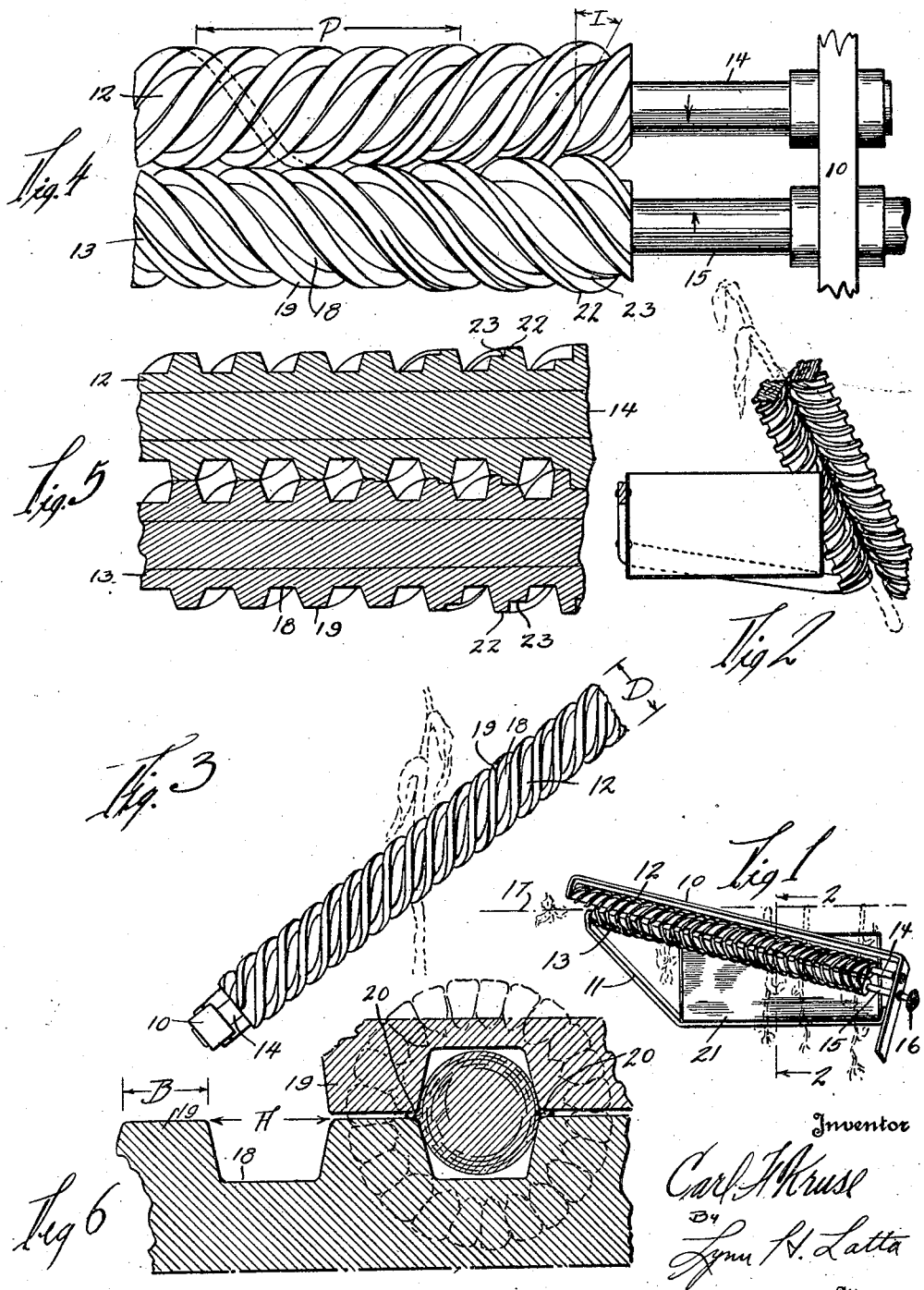

1,641,682

UNITED STATES PATENT OFFICE.

CARL F. KRUSE, OF KINGSLEY, IOWA.

CORN HARVESTER.

Application filed October 25, 1926. Serial No. 143,922.

My invention relates to corn harvesters and it is my purpose to provide a harvester in which a single set of rolls is adapted to simultaneously remove the ears of corn from the standing stalks and to remove the husks from the ears. The present application is filed as a substitute for my previous application filed August 25, 1923, Serial No. 659,342.

More specifically, it is my object to provide a pair of husking rolls, each having a plurality of helical grooves pitched oppositely to those of the other roll and registering with them, the grooves being of such width, depth, and pitch that when the rolls are in their normal inclined position relative to the ground, the registering portions of the grooves will assume substantially vertical positions to receive the corn stalks and feed them rearwardly in constant vertical positions and so that the edges of the ribs bordering a particular groove in which a corn stalk is received will grip the husks of an ear of corn at the base of the ear with sufficient friction to pull the husks between the rolls and at the same time to resist movement of the butt of the ear itself into the rolls, whereby the husks will be pulled from the ear in a body.

A further object is to provide a corn harvester machine having such a pair of rolls in which the grooves, in addition to being so pitched and of such width and depth as to give the foregoing results, are so pitched that the longitudinal speed at which the stalks will be carried between the rolls may be properly coordinated with a practical, rotational speed at which the husking may be successfully accomplished.

A still further object of the invention is to provide such a pair of rolls having grooves adapted to perform, in addition to the foregoing functions, the function of selecting only one stalk of corn at a time; that is, of excluding more than one stalk from between pairs of registering grooves.

Another object of my invention is to provide a harvesting machine in which a shelled corn pan may be used directly beneath the rolls without interfering with the passage of stalks between the rolls in their standing positions.

A further object of the invention resides in a means for driving one of the rolls from the other without interfering with the passage of stalks between the rolls, said driving means being such as may be practically embodied in the manufacture of the rolls without undue expense and such as to eliminate all possibility of binding between the rolls, due to wear or faulty adjustment of the bearings.

With these and other objects in view, my invention consists in the construction, arragement and combination of the various parts of my device, whereby the objects contemplated are attained, as hereinafter more fully set forth, pointed out in my claims, and illustrated in the accompanying drawings, in which:

Fig. 1 is a plan view of that portion of a corn harvester embodying my invention.

Fig. 2 is a vertical, sectional view taken of line 2—2 of Fig. 1.

Fig. 3 is an elevation of the outer of a pair of rolls viewed from between the rolls.

Fig. 4 is a detail view of the upper ends of a pair of rolls illustrating in substantially correct proportion the depth, width, and pitch of the grooves and showing the driving connection between the rolls.

Fig. 5 is a longitudinal, sectional view of the same.

Fig. 6 is an enlarged, longitudinal, sectional view through the rolls, the ear of corn being indicated in dotted lines.

In my prior application, above referred to, I have attempted to illustrate and describe a corn harvesting machine which would successfully combine the functions of picking and husking in a single set of rolls. It is known that such a result has been sought for many years but I believe that the failure of such prior attempts has been due to the lacking of actual knowledge of field conditions by those who have attempted to solve the problem.

I have found a structure built in accordance with the following specifications to be highly successful in the field, husking an average of 25 per cent higher than the husking that is done by the ordinary harvesters having a separate set of husking rolls, in addition to the snapping rolls.

I attribute the success of the machine constructed in accordance with my invention, to the proper coordination of those dimensions which provide for the width and pitch of the grooves in the rolls.

Before proceeding to a detailed description of these features, it may be briefly stated that the general function of a pair of rolls is to receive between them in a pair of registering grooves a stalk of corn, at a point near the ground so that should the stalk be in a reclining position, it may be elevated to thence carry the stalk beyond the point intermediate of the ends of the rolls to which position the rolls will have travelled up the corn stalk to reach the ear of corn, the husks of which will be engaged by the ribs of the rolls and pulled through the rolls together with the stalk while the ear is forced on upwardly. To successfully attain this, it is necessary: (1) to receive but a stalk at a time between the rolls, (2) that the stalk be received in the grooves between the rolls and not clog the operation of the machine by being caught between the ribs, and (3) that the husks be securely engaged in order to insure clean husking.

I find that the machine operates most smoothly when the corn stalks are carried through the rolls at a rate of speed corresponding to the forward advance of the machine over the ground.

Before proceeding to specify those features of construction which accomplish these functions, I will briefly describe the construction of the rolls.

I have used the reference characters 10 and 11 to indicate downwardly and forwardly inclined frame members between which are journalled the rolls 12 and 13, respectively. At their upper ends, the rolls are spaced from the frame as shown in Fig. 1, so as to facilitate the removal of the stalks from the machine after the husking has been done. The rolls 12 and 13 have shafts 14 and 15 respectively which journal the rolls in the frame members for rotation and the shaft 15 carries a suitable pinion 16 by means of which power may be transmitted to the roll 13. The rolls are so built in the machine that when the machine is travelling parallel to a corn row, as indicated at 17 in Fig. 1, the rolls will be inclined upwardly, rearwardly, and laterally from the corn row. The upward inclination is shown approximately in Fig. 3, and the lateral inclination in Fig. 1. The roll 12 extends beyond the end of the roll 13 and consequently, as the machine is moved forwardly, the corn stalks will first engage the roll 12.

Due to the lateral inclination of the roll, the roll 12 will press against the stalk in the direction of the roll 13 and consequently the stalk will slip into one of the grooves 18 formed between the ribs 19. The sides of the ribs are somewhat inclined to facilitate moulding of the roll, although ribs which were squared in cross section could successfully be used.

After having been first received in one of the grooves of the roll 12, the bordering rib of the roll 13 will close over the stalk and urge it more securely into a particular groove. The rolls rotate toward each other in the direction indicated by the arrows in Fig. 4, and as the machine progresses, this rotation will carry the stalk rearwardly relative to the rolls by leaving it in a plane, transverse of the machine and vertical relative to the ground.

When the stalk has reached a position somewhat rearwardly of a point intermediate of the ends of the rolls, the rolls will have travelled up the stalk to a proper height to have gripped the average ear. The ordinary ear of corn has a stem several inches in length and as this is pulled between the rolls, the ear will assume a substantially upright position.

As the butt of the ear comes into engagement with the rolls, the corners of the ribs 19 on either side of the particular grooves containing the corn stalk, will engage the husks as at 20 in Fig. 6, on either side of the ear.

I find that husking is most effectively accomplished when the distance A (Fig. 6) between the corners of adjacent ribs, is approximately an inch and a quarter. This distance may vary from an inch to an inch and a half with somewhat varying degrees of success.

It may now be stated that those functions of the rolls which have been heretofore alluded to as essential or desirable, are accomplished by the following characteristics of the construction of my rolls. First, in order to insure the proper entrance of the stalks one at a time between the rolls, and to insure against the wedging of the stalks between the rolls, the lower ends of the rolls are of uniform diameter, or substantially so, in order that the ribs may register in contact with each other entirely to the ends of the rolls or of the shorter roll, and consequently the end of the rolls or of the shorter roll where they are staggered, are or is substantially square. In this respect, my construction differs with prior picking roll constructions in that the rolls are not tapered at their receiving ends.

In order to insure clean husking, the rolls are positioned in contact during their entire length or during that portion of the length where husking occurs, or must be close enough together to insure the gripping of the husks between the engaging and registering ribs. I find that a machine will successfully operate with the rolls slightly separated at their forward ends so that they are not in actual contact even where husking occurs possibly as much as an eighth of an inch separating them without destroying the grip of the ribs upon the husks. The important feature of my invention in this regard lies in the obtaining of a positive grip upon the husks at two points diametrically opposed to each other.

The last function, the absolute necessity of which I am not certain, although I find that a machine operates more satisfactorily when the stalks are carried through the machine in an upright position, has to do with the speed of the rolls and the construction of the grooves.

Thus, although I consider the most important features of my invention in the order of their contribution to the success of a machine constructed according to my invention, to be: first, the squaring of the ends of the rolls to insure proper feeding and, second, the substantial contact of the ribs and their being spaced the proper distance apart to insure clean husking, the other features of my invention I believe contribute to some degree to the successful operating of the machine and I will therefore proceed to give a detailed explanation of what I believe to be the proper coordination of the various dimensions of the rolls to produce the best result.

In order that a minimum of power may be required to pull the harvester, the circumferential speed of the rolls is only a little more than the rate at which the rolls travel vertically relative to the corn stalks. That is assuming the inclination of the rolls in a vertical plane to be thirty-seven degrees, the pitch of a groove to be nine inches, and its outer diameter, four inches, during a forward advance of a yard the intersection of the rolls with a vertical stalk will have shifted to a point about twenty-seven inches higher on the stalk than at the beginning of that advance, and the rolls will have rotated through a circumferential distance of approximately forty-eight inches. Thus the rate at which the rolls have rotated ahead of the stalk will have been about twenty-one inches for each yard of advance, or about five inches for each rotation of the rolls, as compared with a roll circumference of twelve and fifty-six hundredths.

It will be understood that this difference in speeds (which may be termed "slippage") may vary from a negative quantity (in which case the corn stalks will be pulled through the rolls) to a larger amount than given, but in the former case there is less efficient husking, and in the latter, an excess of power required for driving the rolls.

In the above figures, the rate of advance for each revolution of a roller has been taken as nine inches—the pitch of the roll grooves. Using the ratio of "slippage" to advance as a basis for determining the desirable slippage, in the above example, the "slippage ratio" will be approximately five-ninths. It may now be stated that the "slippage ratio" should vary between about 25 and 100 per cent, for successful picking and husking.

In obtaining the proper figure for this ratio, the groove and rib widths, number of grooves, groove pitch, rate of advance of the machine, rotational speed of the rolls, vertical inclination of the rolls, and groove inclination must all be considered.

The groove width must be practically constant, and may be designated as G. The rate of advance of the machine may be taken as a constant also, since ordinarily, a picking machine is driven at a predetermined rate of travel. As has already been shown, the groove pitch must be the same as the rate of advance, and the value of both machine advance and pitch may therefore be designated as P. The rib width B is approximately one inch in the rolls shown in the drawings, but may be made smaller with good results. A much greater width than an inch will cause the rolls to function inefficiently in selecting the stalks, and will increase the resistance of the stalks to the rotation of the rolls. A width much narrower than three quarters of an inch will reduce the gripping efficiency of the ribs in husking.

The number N of ribs, dependent upon the groove and rib widths, and I find that the best number is four, this figure being quotient of the pitch, nine inches, divided by the sum of groove and rib widths, two and one quarter inches.

The groove inclination I is dependent on the vertical inclination of the rolls, and it will be seen that, in order that the registering portions of the grooves may be normally vertical, the value I must be the same as the normal inclination of the rolls in a vertical plane.

The vertical inclination of the rolls in turn is to be determined by the average conditions encountered in the field, especially the problem of fallen corn, and is normally about 37 degrees, as in most of the present corn pickers. It will be understood that adjustment of the rolls in a vertical plane is provided for as in other pickers, and that the deviation from vertical of the registering groove portions, thus caused, will not be enough to substantially affect the passage of stalks through the rolls.

Taking I as the constant, therefore, having a value of 37 degrees, it will be seen that the diameter D of the rolls will be determined from the formula co-tangent $$I = \frac{pi\ D}{P}.$$

Since the co-tangent of 37 degrees is about 1.374, the equation may be reduced to $$\frac{pi\ D}{P} = 1.374.$$

Inserting the given value of P, the result is, $$\frac{pi\ D}{9} = 1.374,$$

or pi D=12.56. From this, the diameter of the rolls is found to be $$\frac{12.56}{PI} = 4\ \text{inches}.$$

It will be understood, however, that in a machine built to be propelled by a high powered tractor, the value P may differ from that in a horse drawn machine, and that the roll diameter may be correspondingly varied. Furthermore, in a machine built for use in one locality, where the conditions of standing corn are different from those in another locality, the vertical inclination of the rolls may be changed, thus also changing the values of roll dimensions. At all times, however, the values will bear substantially the relationship $$\frac{pi\ D}{P} = \cot.\ I.$$

The number of grooves will enter this equation from the following relation, namely, P=N(A+B), and the result will be $$\frac{pi\ D}{N(A+B)} = \cot.\ I.$$

Returning to the constant R (slippage ratio), it is noted that a change in this value will necessitate a change in the diameter of the roll. As has already been shown, the value of 5/9 for R, will give a value of four inches to D when P is nine inches, and since a value for R which is between .25 and 1, is desirable, it will be seen that the proper values for machine advance, slippage, vertical inclination, and groove width, may be obtained in a roll approximately four inches in diameter, and having four threads.

This may be shown by evolving a formula for R. Indicating slippage by S, $R = \frac{S}{P}$.

S=the circumference of a roll minus the climb of a roll on a stalk during one evolution, or pi D−P tangent I. Then $$R = \frac{pi\ D - P \tan.\ I}{P} = \frac{pi\ D}{P} - \tan.\ I.$$

Substituting the value of $$\frac{pi\ D}{P},$$

which is cot. I, as determined in the foregoing discussion, of the relation between vertical inclination, pitch, and groove width, independent of slippage, the value R in this relation is as follows:

$$R = \cot.\ I - \tan.\ I.$$

Substituting the values of cotangent and tangent of 37 degrees, we obtain:

$$R = 1.3270 - .7536 = .5734.$$

When the angle I is reduced to 30 degrees, the value of R is increased to 1.7321−5774, or 1.1547, so that at this inclination of the rolls, the slippage will be almost twice as much as at 37 degrees. At 25 degrees, R is 2.1445−4663, or 1.6782, or about three times the slippage at 37 degrees. At 20 degrees, R is 2.3835, or over four times the amount at 37 degrees.

At 40 degrees, R=.3527, and at 45 degrees, it is 0. At a greater inclination than 45 degrees, R will have a negative value, indicating that the stalks will be pulled instead of pushed, through the rolls.

I find that fairly satisfactory results can be obtained with the rolls approaching very near to the 45 degrees angle, and at angles as low, but not lower than, 30 degrees. The most efficient inclination is the mean between these angles, namely, about 37 degrees.

It will now be seen that the pitch of the rolls and the width of the grooves are most important in attaining the successful picking and husking of the corn.

The depth of the grooves (which is more than one-half the width of the grooves) is not as important as the pitch and width, although it must be sufficient to accommodate the corn stalks without undue friction and to prevent engagement of the ears by the bottom of the grooves. Should the latter occur, the gripping action of the corners of the ribs would be interfered with. By engaging the husks at only two points, I accomplish husking in the most efficient manner.

By inclining the rolls laterally to the row of corn, I attain, not only the proper feeding of the stalks into the machine, but also the catching of loose grains of corn dislodged by the husking operation. In the ordinary machine where the picking rolls are positioned in the plane of the row of corn, it is impossible to place a pan or the like underneath the rolls since such a pan would be interfered with by the stalks of corn. By inclining the rolls laterally, a pan 21 may be secured as shown in Fig. 1, directly below those portions of the rolls which do the picking and husking.

A further advantage in passing the stalks through the machine in a substantially upright position lies in the fact that the stalks will thus serve to elevate the ears of corn after they have been husked, between the rolls, the rolls themselves together with the corn stalks serving as an elevator. The ears may then be deposited in a hopper or receptacle at the rear ends of the rolls, which has not been illustrated in the drawings.

In order to drive the rolls, the ordinary corn picker provides a pair of gears at the rear ends of the rolls themselves; such gears are interfered with by the stalk of corn passing between the rolls, and I therefore employ a driving connection formed directly on the ribs 19. The ribs near the upper ends of the rolls are provided with a raised portion 22 gradually increasing in height and a corresponding depressed portion of one roll registers with the depressed portion of the other and the raised portions thus overlap each other so that their side faces engage. The raised portion of the roll 13 is positioned behind the raised portion of the roll 12 so that the roll 13 may drive the roll 12 when rotated in the direction indicated in Fig. 4.

It will be noted that these interlocking, driving members do not interfere with the space formed between the grooves and thus allow the stalks to pass through the rolls without resistance. Since the flat side faces of the raised portions do the driving and since these faces are of considerable width near the upper ends of the rolls, it will be seen that it is practically impossible for the raised portions to wear sufficiently to allow the ribs to assume positions materially out of alignment. There is very little friction in the driving engagement of the rolls since the only contact is between the flat sides of the raised portions and the pressure between the rolls can not be translated into radial force which could cause the rolls to bind.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a corn harvester, a frame, and a pair of rolls positioned in the frame with a normal rearward and upward inclination of between thirty and forty-five degrees, the rolls being provided with at least three registering helical grooves, pitched at angles of between forty-five and sixty degrees to the axes of the rolls.

2. In a corn harvester, a frame, and a pair of rolls positioned in the frame with a normay rearward and upward inclination of between thirty and forty-five degrees, the rolls being provided with at least three registering helical grooves, pitched at angles of between forty-five and sixty degrees to the axes of the rolls, the grooves being between one inch and one and a half inches in width.

3. In a corn harvester, a frame, adapted to travel parallel to a corn row, a pair of combined picking and husking rolls mounted in the frame in a position inclined rearwardly, upwardly, and laterally relative to the direction of travel of the machine, and a shelled corn pan supported under the intermediate portions of the rolls, and disposed to one side of the lower ends thereof.

4. In a corn harvester, a frame, and a pair of rolls positioned in the frame with a normal rearward and upward inclination of between thirty and forty-five degrees, the rolls being provided with at least three registering helical grooves, pitched at angles of between forty-five and sixty degrees to the axes of the rolls, the registering portions of said grooves being disposed in substantially vertical positions.

5. In a corn harvester, a pair of combined picking and husking rolls, provided with helical grooves forming ribs, said ribs being divided at the rear extremities of the rolls to form radially extended and depressed portions, the extended portion of either roll registering with the depressed portion of the other roll, and overlapping the extended portion of said other roll.

6. In a corn harvester, a frame and a pair of rolls positioned in the frame with a normal rearward and upward inclination of between thirty and forty-five degrees, the rolls being provided with at least three registering helical grooves pitched at angles of between forty-five and sixty degrees to the axes of the rolls and forming ribs which are the same distance apart at all points along the length of the roll from the lower ends thereof to the region where husking takes place.

Signed this 7th day of October, 1926, at Sioux City, in the county of Woodbury and State of Iowa.

CARL F. KRUSE.